United States Patent [19]
Yokota

[11] Patent Number: 5,748,369
[45] Date of Patent: May 5, 1998

[54] POLARIZING BEAM SPLITTER AND AN ILLUMINATING DEVICE PROVIDED WITH THE SAME

[75] Inventor: Hideo Yokota, Yokohama, Japan

[73] Assignee: Canon Kabushiki Kaisha, Tokyo, Japan

[21] Appl. No.: 535,790

[22] Filed: Sep. 28, 1995

Related U.S. Application Data

[63] Continuation of Ser. No. 139,438, Oct. 20, 1993, abandoned.

[30] Foreign Application Priority Data

Oct. 29, 1992 [JP] Japan .................................. 4-291497

[51] Int. Cl.$^6$ .................................................. G02B 5/30
[52] U.S. Cl. ........................ 359/487; 359/485; 359/500; 349/9; 353/20; 362/19
[58] Field of Search ........................ 359/495, 496, 359/499, 583, 483, 485, 500, 487; 362/19; 353/8, 20; 349/9, 96

[56] References Cited

U.S. PATENT DOCUMENTS

| | | | |
|---|---|---|---|
| 2,748,659 | 6/1956 | Geffcken et al. | 359/495 |
| 2,810,324 | 10/1957 | Marks | 359/495 |
| 2,821,114 | 1/1958 | Wiemer et al. | 359/495 |
| 2,868,076 | 1/1959 | Grffcken et al. | 359/495 |
| 3,508,809 | 4/1970 | Wider et al. | 359/495 |
| 3,876,285 | 4/1975 | Schwarzmüller | 359/495 |
| 4,997,261 | 3/1991 | Taniura | 359/495 |
| 5,124,841 | 6/1992 | Oishi | 359/495 |
| 5,164,854 | 11/1992 | Takanashi et al. | 359/495 |
| 5,198,928 | 3/1993 | Chauvin | 359/495 |
| 5,309,422 | 5/1994 | Kuroki et al. | 359/495 |
| 5,357,370 | 10/1994 | Miyatake et al. | 359/500 |

FOREIGN PATENT DOCUMENTS

| | | | |
|---|---|---|---|
| 1265206 | 10/1989 | Japan . | |
| 1714554 | 2/1992 | U.S.S.R. | 359/485 |

Primary Examiner—Ricky D. Shafer
Assistant Examiner—John Juba, Jr.
Attorney, Agent, or Firm—Morgan & Finnegan, LLP

[57] ABSTRACT

This invention relates to a polarizing beam splitter and an illuminating device having the polarizing beam splitter. The polarizing beam splitter of this invention comprises a transparent flat plate and films of a dielectric material provided on the opposite surfaces of the plate.

18 Claims, 9 Drawing Sheets

─┼─► P-POLARIZED LIGHT

─●─► S-POLARIZED LIGHT

─⦂⦂─► CIRCULARLY
POLARIZED LIGHT

─◆─► NON-POLARIZED LIGHT 5,748,369

POLARIZING BEAM SPLITTER AND AN ILLUMINATING DEVICE PROVIDED WITH THE SAME

This is a continuation of application Ser. No. 08/139,438, filed on Oct. 20, 1993, now abandoned.

BACKGROUND OF THE INVENTION

1. Field of the Invention

Polarizing beam splitters are used in various optical apparatuses, and a polarizing beam splitter usually comprises a cube having multi-layer film of a dielectric material provided between the slopes of two prisms.

2. Related Background Art

Such cube is by no means light and therefore, it has heretofore been desired to make polarizing beam splitters thin.

A polarizing beam splitter shown in FIG. 1 of the accompanying drawings is one which complies with such desire, and it comprises a number of small cube-like polarizing beam splitters juxtaposed.

The polarizing beam splitter of FIG. 1, however, is too complicated in structure.

A polarizing beam splitter shown in FIG. 2 of the accompanying drawings is an another example of the thin polarizing beam splitter. This polarizing beam splitter comprises a number of thin glass plates simply arranged parallel to one another.

The polarizing beam splitter shown in FIG. 2, however, is not preferable because it requires a great number of glass plates.

SUMMARY OF THE INVENTION

It is an object of the present invention to provide a polarizing beam splitter of simple structure.

It is another object of the present invention to provide an improved illuminating device provided with such polarizing beam splitter.

The polarizing beam splitter of the present invention is provided with a transparent flat plate and films of a dielectric material supplied to the opposite surfaces of said plate.

Another polarizing beam splitter of the present invention is provided with a first member including a transparent flat plate and films of a dielectric material supplied to the opposite surfaces of said flat plate, and a second member including a transparent flat plate and films of a dielectric material supplied to the opposite surfaces of said flat plate, the flat plate of said second member being provided parallel to the flat plate of said first member.

There is a preferred form of said another polarizing beam splitter in which that dielectric material film of said first member which is adjacent to said second member and that dielectric material film of said second member which is adjacent to said first member comprise a common dielectric material film.

In a preferred form of the present polarizing beam splitter, the distance between the dielectric material films on said opposite surfaces is sufficiently greater than the wavelength of incident light, and each of said dielectric material film transmits therethrough most of the P-polarized light of light incident at an angle of incidence of 45°.

The illuminating device of the present invention is provided with each said polarizing beam splitter in the optical path of light illuminating an object to be illuminated.

The image forming apparatus of the present invention is provided with each said polarizing beam splitter in the optical path of light illuminating a light valve for forming an image.

The optical apparatus of the present invention is provided with said polarizing beam splitter in the optical path thereof.

DESCRIPTION OF THE PREFERRED EMBODIMENTS

Figure 1:
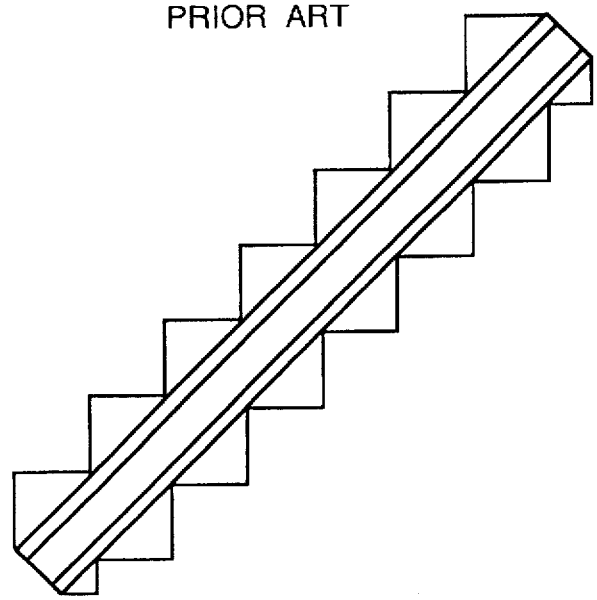
FIG. 1 shows a polarizing beam splitter (polarizing separator) according to the prior art.
Figure 2:
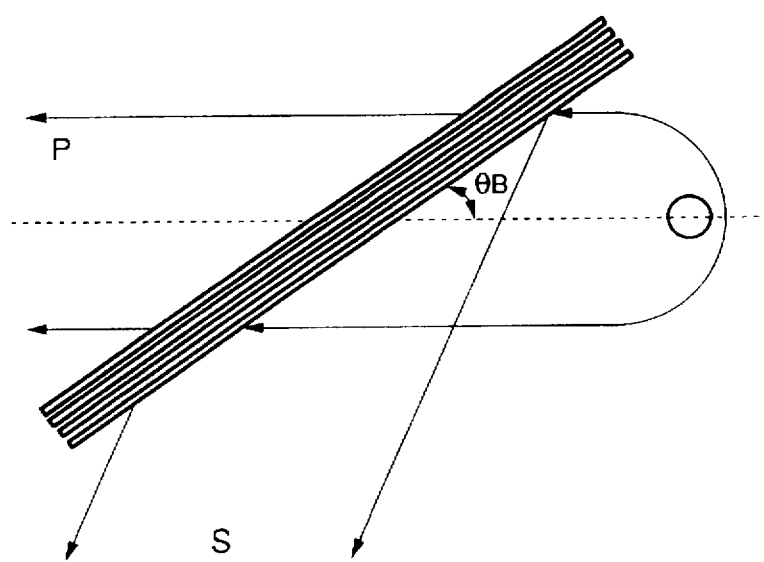
FIG. 2 shows a polarizing beam splitter according to the prior art.
Figure 3:
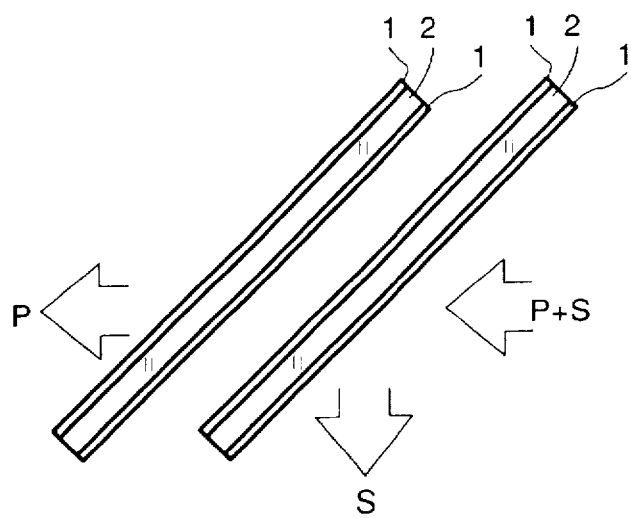
FIG. 3 shows an embodiment of the polarizing separator of the present invention.

Referring to FIG. 3 which shows an embodiment of the polarizing beam splitter (polarizing separator) of the present invention, the reference numeral 1 designates thin dielectric material films which are interference polarizing separating members, and the reference numeral 2 denotes holding members such as glass substrates.

If thin dielectric material film of such a characteristic that the transmittances (reflectances) of a P-polarized component and an S-polarized component differ from each other for light of a wide wavelength range incident at an angle of incidence of approximately 45°, for example, light from a white light source, is deposited on one surface of the glass substrate 2, when the transmittance of P-polarized light is $T_P$ and the transmittance of S-polarized light is $T_S$, the transmittances of the respective polarized lights in a film are $T_P > T_S$. A plurality of such films are provided and light is transmitted therethrough, whereby polarized light of low transmittance (high reflectance) is more reflected, and the relation between the respective transmittance of the light passed through the films i times becomes $T_P \gg T_S$, and the light becomes separable into a pair of polarized lights differing in polarized component from each other.

Figure 4:
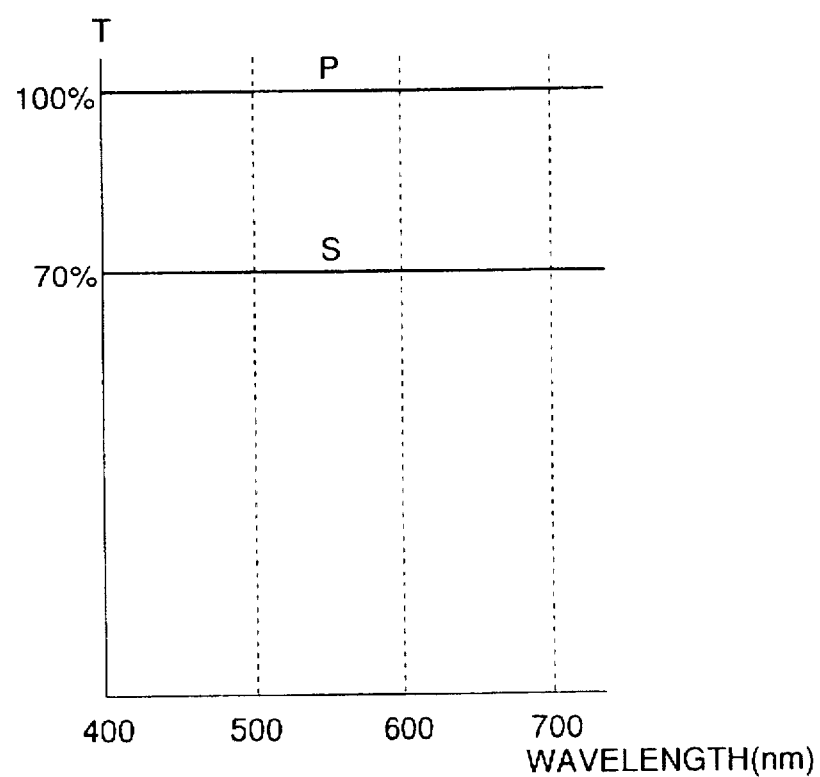
FIG. 4 shows an example of the characteristic of dielectric material film used in the present invention.

The dielectric material film 1, as shown, for example, in FIG. 4, has such a characteristic that for non-polarized light incident at an angle of incidence of approximately 45°, the transmittance of P-polarized light is 100% and the transmittance of S-polarized light is 70%, and such dielectric material films are deposited on the opposite surfaces of the glass substrate 2 to thereby construct a single polarizing separating element, and a plurality of such polarizing separating elements are disposed substantially parallel to one another with a great interval between adjacent ones of them. This interval between adjacent ones of the elements is set to a sufficient great value relative to the wavelength of the incident light, whereby the interference between the thin films can be prevented. When visible light is to be separated into a pair of polarized lights, the interval between the dielectric material films can be of the order of 0.01 mm ($\gg 550$ nm: the substantially central wavelength of the visible light). Incidentally, where dielectric material films are provided on the opposite surfaces of the glass substrate, the interval between the dielectric material films on the opposite surfaces of the glass substrate satisfies the above-mentioned condition ($\leq 0.01$ mm) because the thickness of the glass substrate is at least about 1 mm. Metal foil or the like is sandwiched between the marginal portions of a pair of polarizing separating elements and is urged there against from one side, whereby the pair of polarizing separating elements can be made into a block. Instead of metal foil, a both-side tape or the like having a bonding action on both sides thereof may be sandwiched between the marginal portions of a pair of polarizing separating elements to thereby make them integral. However, with it taken into account that each polarizing separating element is expanded by receiving light from a light source, preferably the elements may not be fixed with respect to a direction perpendicular to the optical axis from the light source.

Figure 5:
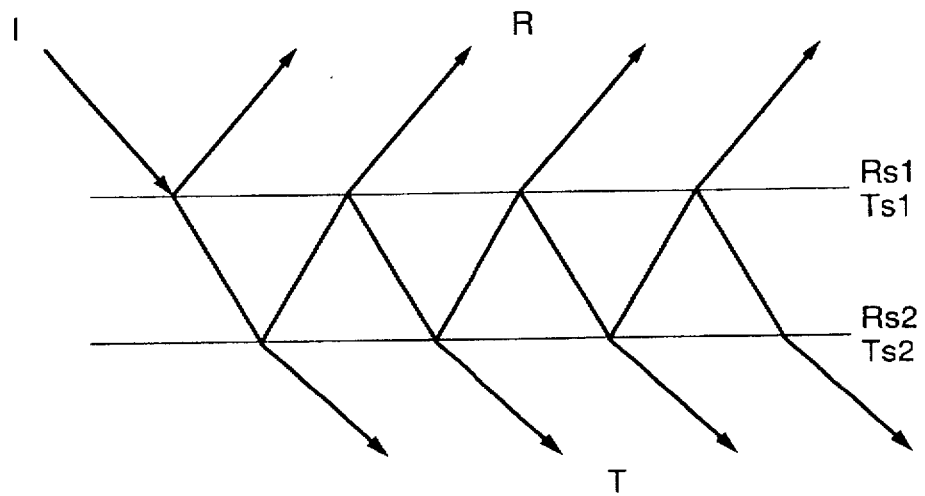
FIG. 5 shows the manner of reflection and transmission of rays of light in the polarizing separator of the present invention.

The polarizing separating efficiency of the polarizing separating element of the present embodiment will now be described with reference to FIG. 5. When the transmittance and reflectance of the first dielectric material film for S-polarized light are $T_{S1}$ and $R_{S1}$, respectively, and the transmittance and reflectance of the second dielectric material film for S-polarized light are $T_{S2}$ and $R_{S2}$, respectively, the combined transmittance $T_{S01}$, taking the multiple reflection on the surfaces of these two films into account is:

$$\begin{aligned} T_{S01} &= T_{S1} \cdot T_{S2} + T_{S1} \cdot T_{S2} \cdot (R_{S1} \cdot R_{S2} + \\ & \quad R_{S1}^2 \cdot R_{S2}^2 + \ldots) \\ &= (T_{S1} \cdot T_{S2})/(1 - R_{S1} \cdot R_{S2}). \end{aligned} \quad (1)$$

If the same dielectric material film is deposited, there can be brought about $T_{S1}=T_{S2}=T_S$ and $R_{S1}=R_{S2}=R_S$ and hence, $$T_{S01}=T_S^2/(1-R_S^2) \quad (2)$$

If $T_S=0.7$ and $R_S=0.3$, from equation (2), $T_{S01}=0.538$ and the transmittance $T_{S01}$ of a polarizing separating element for S-polarized light can be found. When two such polarizing separating elements are provided, calculation can likewise be made from equation (2) with $T_S$ and $R_S$ as $T_S=T_{S01}$ and $R_S=1-T_{S01}$, respectively. Hence, the combined transmittance $T_{S02}$ is $T_{S02}=0.368$.

Further, where three polarizing separating elements are provided, $T_{S1}=T_{S01}$, $R_{S1}=1-T_{S01}$, $T_{S2}=T_{S02}$ and $R_{S2}=1-T_{S02}$ can be applied to equation (1), and the combined transmittance $T_{S03}$ of these polarizing separating elements is $T_{S03}=0.280$, that is, the polarizing separating efficiency is $T_P:T_S=1:0.28$.

In the foregoing example, there has been shown a case where use is made of dielectric material film having such a characteristic that as shown in FIG. 4, for non-polarized light incident at an angle of incidence of approximately 45°, the transmittance of P-polarized light is 100% and the transmittance of S-polarized light is 70%, and there will be shown below a case where use is made of dielectric material film having such a characteristic that the transmittance of P-polarized light is 90% and the transmittance of S-polarized light is 63%.

The polarizing separating efficiency of the polarizing separating element of the present embodiment will hereinafter be described with reference to FIG. 5. When the transmittance and reflectance of the first dielectric material film for S-polarized light are $T_{S1}$ and $R_{S1}$, respectively, and the transmittance and reflectance of the second dielectric material film for S-polarized light are $T_{S2}$ and $R_{S2}$, respectively, the combined transmittance $T_{S01}$ taking the multiple reflection on the surfaces of these two films into account is $$\begin{aligned} T_{S01} &= T_{S1} \cdot T_{S2} + T_{S1} \cdot T_{S2} \cdot (R_{S1} \cdot R_{S2} + \\ & \quad R_{S1}^2 \cdot R_{S2}^2 + \ldots) \\ &= (T_{S1} \cdot T_{S2})/(1 - R_{S1} \cdot R_{S2}). \end{aligned}$$

If the same dielectric material film is deposited, there can be brought up $T_{S1}=T_{S2}=T_S$ and $R_{S1}=R_{S2}=R_S$ and hence, $T_{S01}=T_S^2/(1-R_S^2)$.

When $T_S=0.63$ and $R_S=0.37$, from equation (2), $T_{S01}0.460$ and the transmittance of a polarizing separating element for S-polarized light becomes $T_{S01}$. When two such polarizing separating elements are provided, calculation can likewise be made from equation (2) with $T_S$ and $R_S$ as $T_S=T_{S01}$ and $R_S=1-T_{S01}$, respectively. Consequently, the combined transmittance $T_{S02}$ is $T_{S02}=0.299$.

Further, when three polarizing separating elements are provided, $T_{S1}=T_{S01}$, $R_{S1}=1-T_{S01}$, $T_{S2}=T_{S02}$ and $R_{S2}=1-T_{S02}$ can be applied to equation (1).

Next, when with regard to P-polarized light, $T_P=0.9$ and $R_P=0.1$ are likewise substituted for equation (2), $T_{P01}=0.818$ and this becomes the transmittance of a polarizing separating element. When two such polarizing separating elements are provided, calculation can likewise be made from equation (2) with $T_P$ and $R_P$ as $T_P=T_{P01}$ and $R_P=1-T_{P01}$, respectively. Consequently, the combined transmittance $T_{P02}$ is $T_{P02}=0.692$.

From this, the polarizing separating efficiency is $T_p: T_s = 0.692:0.299 \cong 0.7: 0.3$.

Accordingly, $T_p: R_s = 0.7:(1-0.3) = 1:1$.

This means that when light is polarized and separated, P-polarized light transmitted and S-polarized light reflected become substantially equal in quantity of light to each other, and also has the secondary effect that as will be described later, in a polarizing illuminating device, when for example, the direction of polarization of S-polarized light is converted to thereby provide "converted P-polarized light", P-polarized light and the "converted P-polarized light" become equal in quantity of light to each other.

Figure 6:
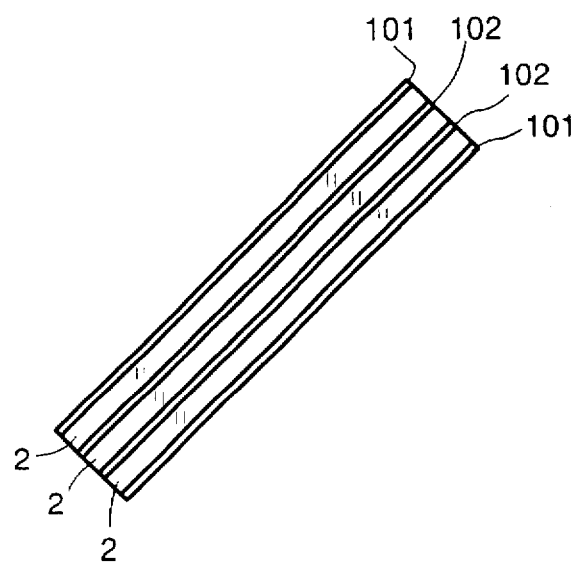
FIG. 6 shows another embodiment of the polarizing separator of the present invention.

Referring to FIG. 6 which shows another embodiment of the present invention, the reference numerals 101 and 102 designate thin dielectric material films, and the reference numeral 2 denotes glass substrates. The difference of this embodiment from the embodiment of FIG. 3 is that the space between adjacent thin dielectric material films is filled with the glass substrate, and as shown in FIG. 6, the thin dielectric material films 101 differing in the transmission characteristic for each polarized light when they contact with the glass and air and the thin dielectric material films 102 differing also in the transmission characteristic for each polarized light when they contact with the glass and the glass are made, and the thin dielectric material films 102 are sandwiched between the glass substrates and further, the thin dielectric material films 101 are provided on the outer sides thereof, whereby a unified polarizing separator can be realized.

Figure 7:
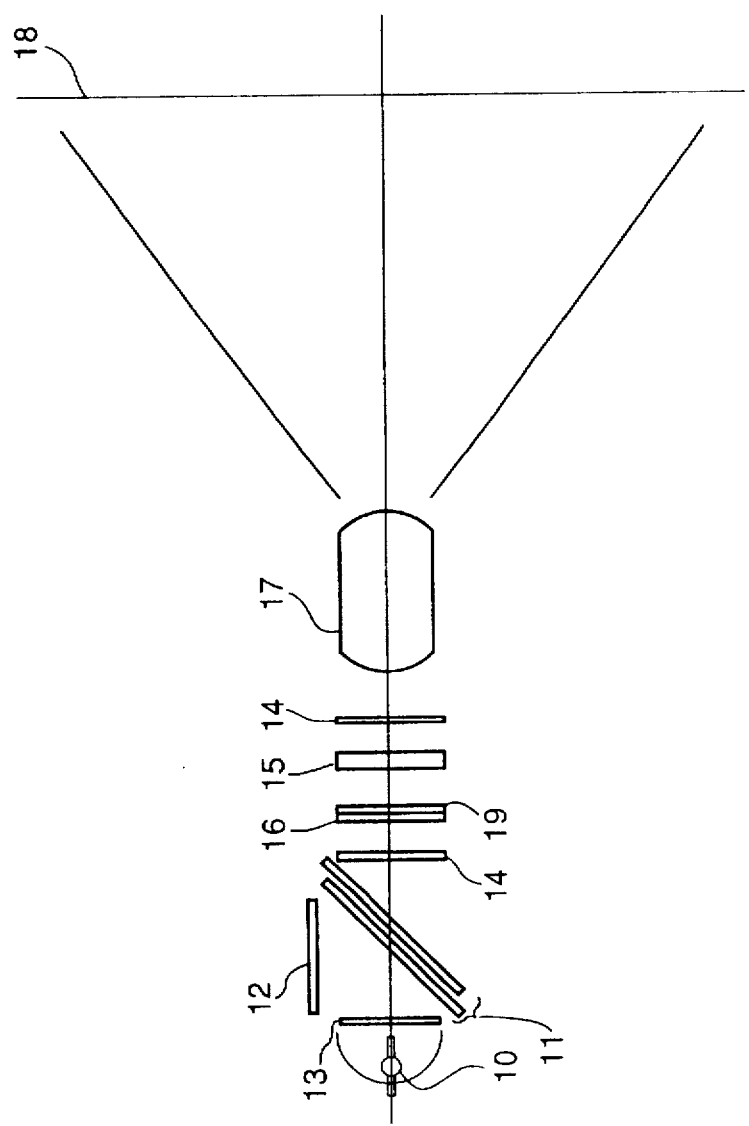
FIG. 7 shows a projector using the polarizing separator of the present invention.

Referring now to FIG. 7 which shows an embodiment of the polarizing beam splitter of the present invention as it is used in a liquid crystal projector, the reference numeral 10 designates a light source such as a metal halide lamp, a halogen lamp or a xenon lamp, the reference numeral 11 denotes the polarizing beam splitter of the present invention, the reference numeral 12 designates a reflecting mirror, the reference numeral 13 denotes a filter for cutting infrared light and ultraviolet light, the reference numeral 14 designates a polarizing filter, the reference numeral 15 denotes a liquid crystal panel, the reference numeral 16 designates a color filter in which R, G and B corresponding to the three primary colors of light are disposed, for example, in a mosaic-like fashion, the reference numeral 17 denotes a projection lens for enlarging and projecting image light modulated by the liquid crystal panel 15, the reference numeral 18 designates a screen, and the reference numeral 19 denotes a wavelength plate such as a half wavelength optical phase plate.

Light emitted from the white light source 10 passes through the cutting filter 13, whereafter it is separated into a P-polarized light component and an S-polarized light component by the polarizing beam splitter 11, and the P-polarized light travels with the S-polarized light which is slightly contained therein cut by the polarizing filter 14, and thereafter is directed to the liquid crystal panel 15. The S-polarized light cut at this time is very little because of the polarizing separation by the polarizing beam splitter as previously described and therefore, heat generated by the polarizing filter 14 is slight. This leads to the effect that even if the liquid crystal panel 15 and the polarizing filter 14 are disposed proximately to each other, the influence of heat upon the liquid crystal panel 15 need not be taken into consideration.

In the present embodiment, the P-polarized light transmitted through the polarizing beam splitter 11 is made to enter the liquid crystal panel 15, but design may also be made such that the S-polarized light reflected by the polarizing beam splitter 11 enters the liquid crystal panel 15.

The direction of polarization of the polarized light emerging from the polarizing beam splitter 11 toward the liquid crystal panel 15 may be brought into coincidence with the direction of orientation of the liquid crystal molecules of the liquid crystal panel 15 in advance. If this is done, the wavelength plate 19 will become unnecessary.

The present embodiment is designed such that the S-polarized light reflected by the polarizing beam splitter 11 is reflected by the reflecting mirror 12 and is returned to the light source 10 again through the polarizing beam splitter 11, and the effect of such design will be described later in connection with the embodiment of FIG. 13.

In FIG. 7, there has been shown an embodiment of a single-plate type liquid crystal projector, but the present invention can likewise be used in a three-plate type liquid crystal projector having separating means such as a dichroic mirror for separating white light into lights of three primary colors R, G and B, a plurality of liquid crystal panels corresponding to R, G and B, and combining means for combining the color lights passed through the liquid crystal panels and directing the combined light to a projection lens, and other multiplate-type liquid crystal projectors.

Figure 8:
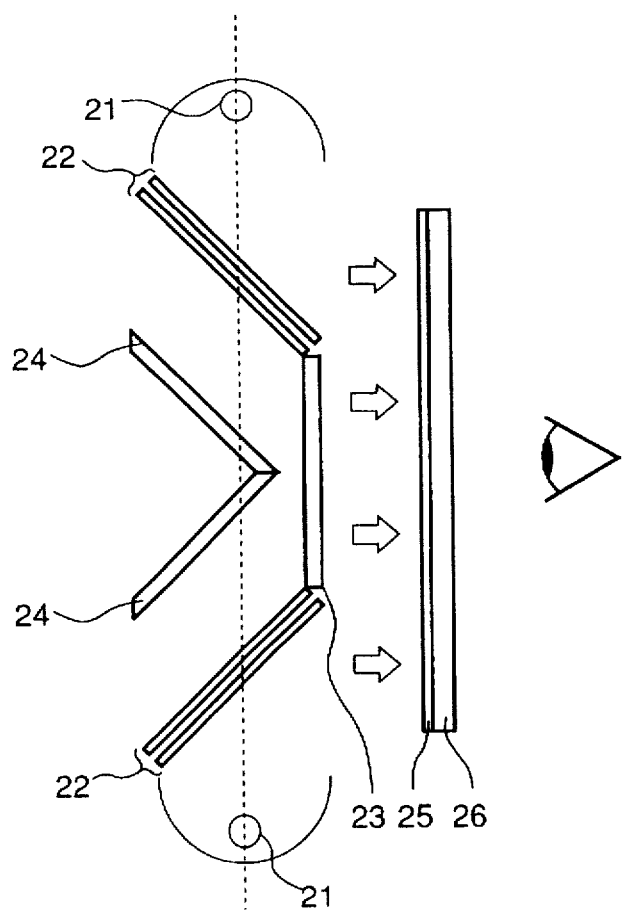
FIG. 8 shows a direct-view type liquid crystal TV using the polarizing separator of the present invention.

FIG. 8 shows an embodiment of the polarizing beam splitter of the present invention as it is applied to the illuminating system of a display device. In FIG. 8, the reference numeral 21 designates a white light source, the reference numeral 22 denotes the polarizing beam splitter of the present invention, the reference numeral 23 designates a wavelength plate such as a half wavelength optical phase plate, the reference numeral 24 denotes a reflecting mirror, the reference numeral 25 designates a polarizing filter, and the reference numeral 26 denotes a liquid crystal panel. Light from the white light source 21 is separated into P-polarized light and S-polarized light by the polarizing beam splitter 22, and the reflected S-polarized light intactly arrives at the liquid crystal panel 26 through the polarizing filter 25, while the transmitted P-polarized light has its direction of polarization rotated by 90° by the wavelength plate 23, whereafter it is reflected by the reflecting mirror 24 and arrives at the liquid crystal panel 26 through the polarizing filter 25.

While the present embodiment is shown as the so-called direct-view type in which image light modulated by the liquid crystal panel is directly observed, a projection lens and a screen of the transmission type may be disposed between the observer and the liquid crystal panel to thereby provide a back projection type projector.

Figure 9:
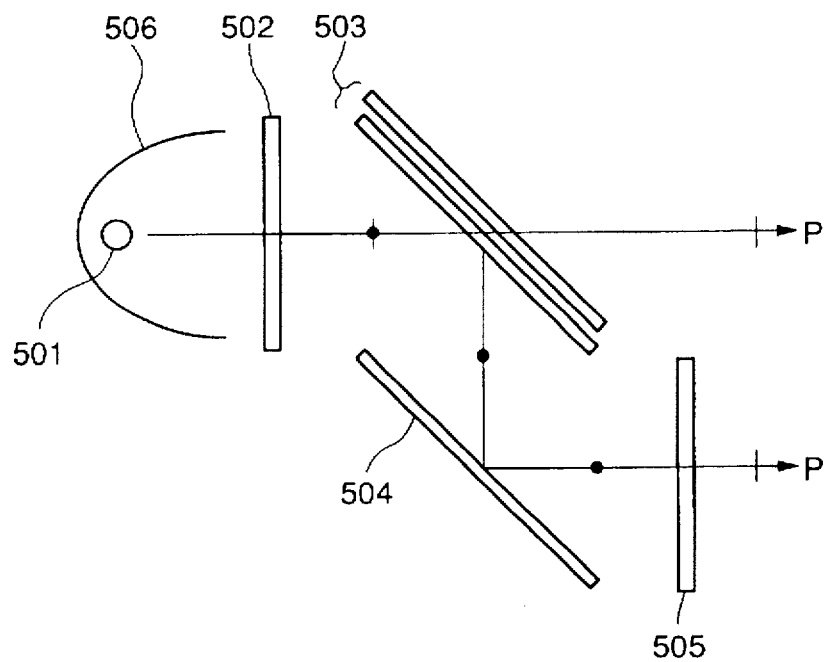
FIG. 9 shows an embodiment of the polarizing illuminating device of the present invention.

FIG. 9 shows an embodiment of a polarizing illuminating device for converting most of light from a white light source into predetermined polarized light and emitting it. In FIG. 9, the reference numeral 501 designates a white light source, the reference numeral 506 denotes a reflector, the reference numeral 502 designates a filter for cutting infrared light and ultraviolet light, the reference numeral 503 denotes the polarizing beam splitter as shown in FIG. 3 or FIG. 6, the reference numeral 504 designates a reflecting mirror, and the reference numeral 505 denotes a half wavelength optical phase plate.

Light emitted from the white light source is separated into P-polarized light and S-polarized light by the polarizing beam splitter 503, whereafter the P-polarized light intactly travels rectilinearly and the S-polarized light is reflected in a direction substantially parallel to said P-polarized light by the reflecting mirror 504 and passes through the half wavelength optical phase plate 505, whereby the S-polarized light is converted into P-polarized light. Thereby, almost all of the light from the white light source is converted into P-polarized light and emerges.

The polarizing illuminating device which can thus emit polarized light in a predetermined direction of polarization is suitable for illuminating a device such as liquid crystal which requires predetermined polarized light.

Figure 10:
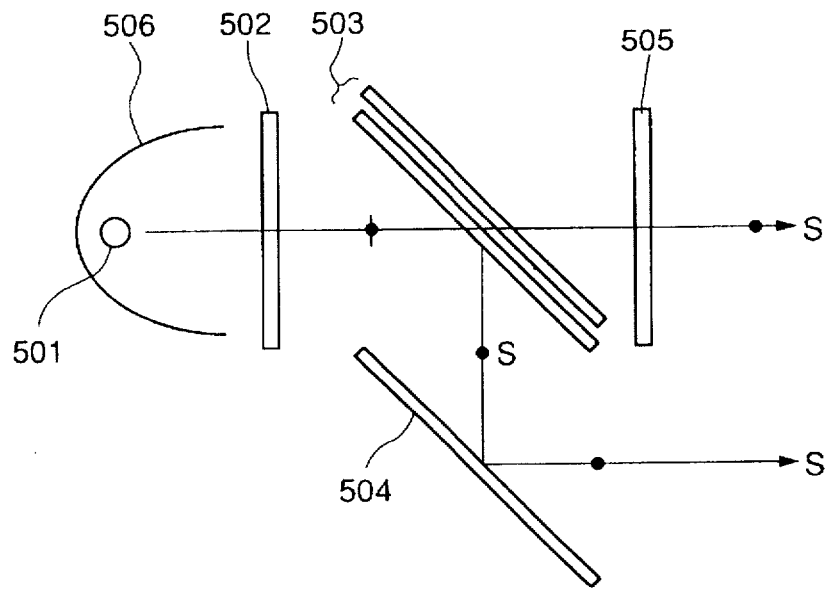
FIG. 10 shows another embodiment of the polarizing illuminating device of the present invention.

As shown in FIG. 10, the half wavelength optical phase plate 505 may be at the P-polarized light emergence side of the polarizing beam splitter 503, and in such case, almost all of the light from the white light source is converted into S-polarized light and emerges.

Figure 11:
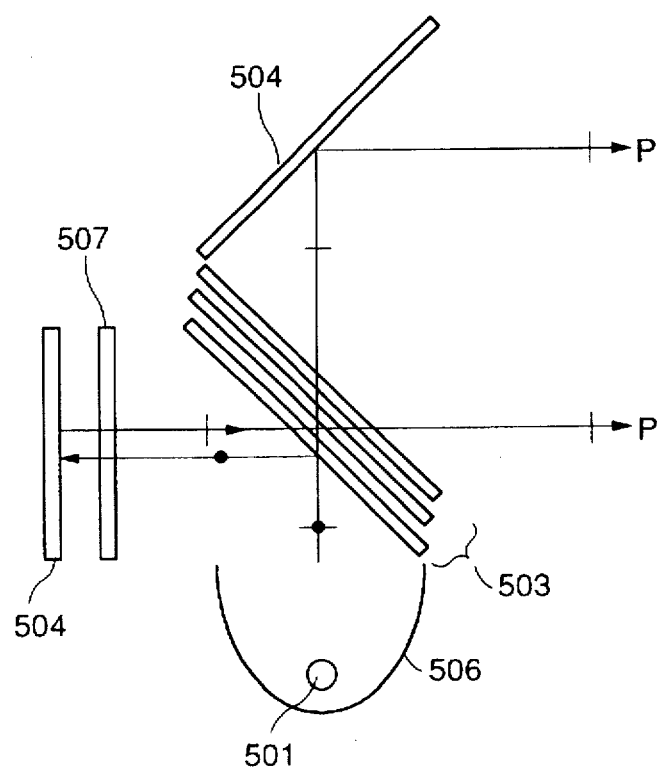
FIG. 11 shows still another embodiment of the polarizing illuminating device of the present invention.

FIG. 11 shows another embodiment of the polarizing illuminating device of the present invention. In FIG. 11, the same members as those in the aforedescribed embodiment of the polarizing illuminating device are given the same reference numerals. In FIG. 11, the reference numeral 507 designates a quarter wavelength optical phase plate.

Light emitted from the white light source 501 is separated into P-polarized light and S-polarized light by the polarizing beam splitter 503, whereafter the P-polarized light is reflected substantially at a right angle by the reflecting mirror 504 and the S-polarized light passes through the quarter wavelength optical phase plate 507 and is converted into circularly polarized light, whereafter it passes through the quarter wavelength optical phase plate 507 again via the reflecting mirror 504. The thus converted P-polarized light is transmitted through and emerges from the polarizing beam splitter 503 and thus, almost all of the light from the white light source is converted into P-polarized light and emerges.

Figure 12:
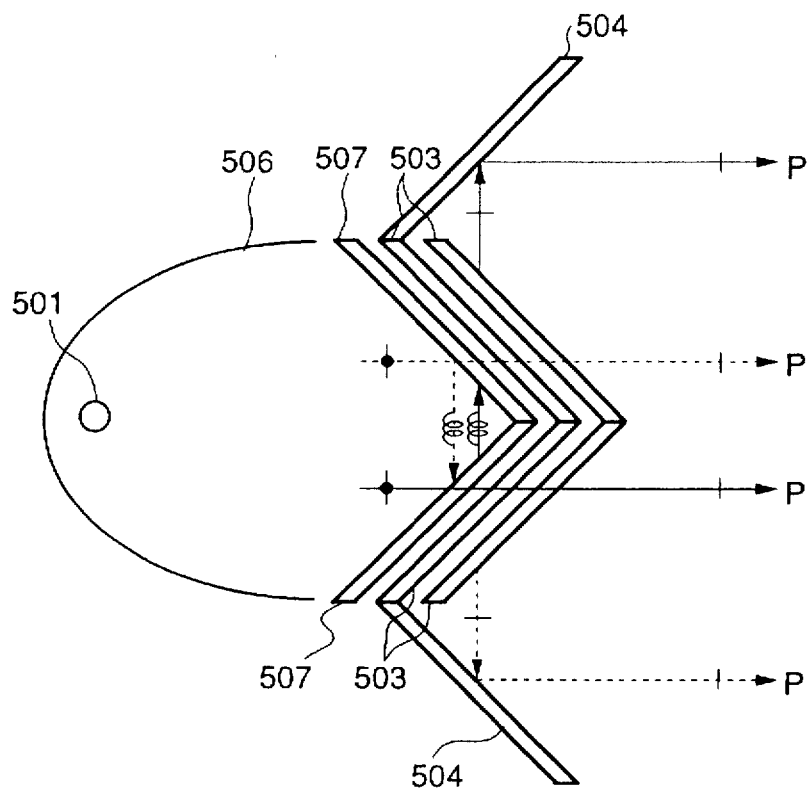
FIG. 12 shows yet still another embodiment of the polarizing illuminating device of the present invention.

FIG. 12 shows still another embodiment of the polarizing illuminating device of the present invention. In FIG. 12, the same members as those in the aforedescribed embodiment are given the same reference numerals.

Light emitted from the white light source passes as non-polarized light through the quarter wavelength optical phase plate 507 and is separated into P-polarized light and S-polarized light by the polarizing beam splitter 503, whereafter the P-polarized light intactly emerges. The S-polarized light passes through one quarter wavelength optical phase plate 507 and is converted into circularly polarized light, whereafter it passes through the other quarter wavelength optical phase plate 507 as shown. The P-polarized light converted in this manner is transmitted through the polarizing beam splitter 503 and is reflected substantially at a right angle by the reflecting mirror 504. Thus, almost all of the light from the white light source is converted into P-polarized light and emerges.

Figure 13:
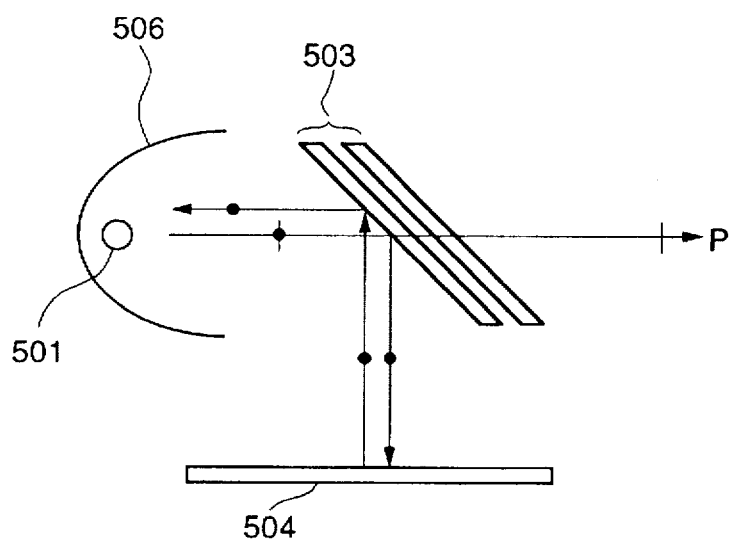
FIG. 13 shows a further embodiment of the polarizing illuminating device of the present invention.

FIG. 13 shows yet still another embodiment of the polarizing illuminating device of the present invention. In FIG. 13, the same members as those in the aforedescribed embodiments of the polarizing illuminating device are given the same reference numerals.

Light emitted from the white light source 501 is separated into P-polarized light and S-polarized light by the polarizing beam splitter 503, whereafter the P-polarized light intactly travels rectilinearly and the S-polarized light is reflected by the reflecting mirror 504 and is returned to the vicinity of the white light source 501 again through the polarizing beam splitter 503. The light returned to the vicinity of the white light source 501 has its direction of polarization disturbed during the reflection on the reflector 506 or by the scattering by the bulb portion of the light source 501 and emerges. This light is again separated into P-polarized light and S-polarized light by the polarizing beam splitter 503. By this process being repeated, almost all of the light from the white light source is converted into P-polarized light and emerges.

Figure 14:
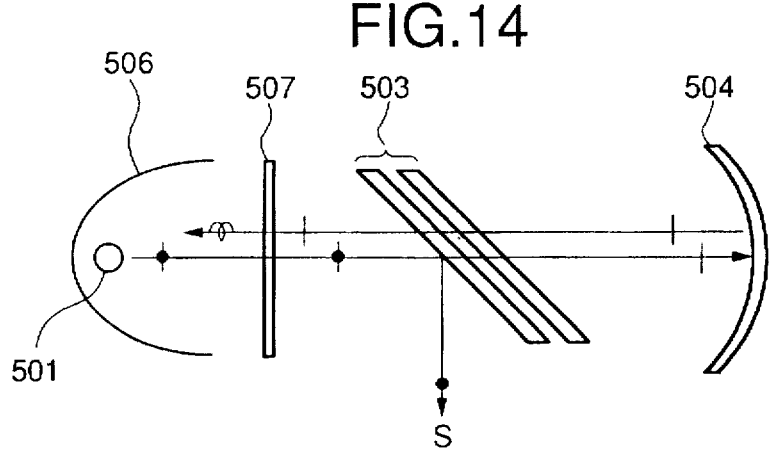
FIG. 14 shows still a further embodiment of the polarizing illuminating device of the present invention.

As a variation of the device of FIG. 13, the reflecting mirror 504 may be disposed in the optical path of the P-polarized light as shown, for example, in FIG. 14. Further, a wavelength plate such as a quarter wavelength optical phase plate 507 may be disposed between the white light source 501 and the polarizing beam splitter 503 so as to positively change the polarized state of the light returned to the white light source 501.

The reflecting mirror 504 is not limited to a plane mirror, but may be a mirror having a curvature like a concave mirror or a convex mirror, or a mirror having an aspherical shape. Also, a corner cube may be employed in lieu of the reflecting mirror so as to reflect light substantially in the same direction as the incident light.

Figure 15:
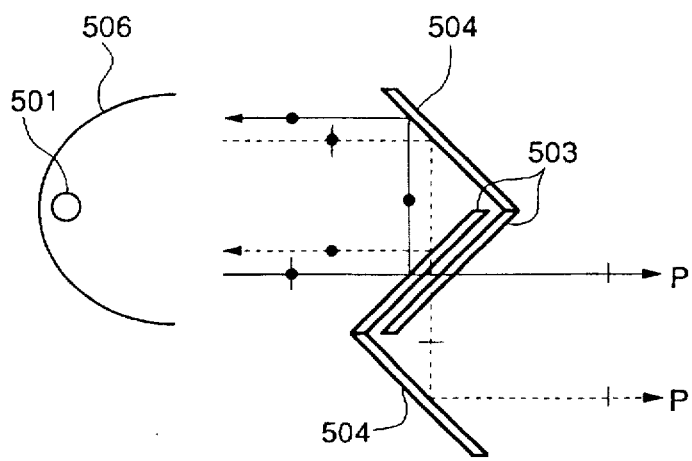
FIG. 15 shows yet still a further embodiment of the polarizing illuminating device of the present invention.

FIG. 15 shows a further embodiment of the polarizing illuminating device of the present invention. In FIG. 15, the same members as those in the aforedescribed embodiments of the polarizing illuminating device are given the same reference numerals.

Part of light emitted from the white light source 501 is separated into P-polarized light and S-polarized light by the polarizing beam splitter 503, whereafter the P-polarized light intactly travels rectilinearly and the S-polarized light is reflected by one reflecting mirror 504 and is returned to the vicinity of the white light source 501. The light returned to the vicinity of the white light source 501 has its direction of polarization disturbed during the reflection on the reflector 506 or by the scattering by the bulb portion of the light source 501 and re-emerges. This light is again separated into P-polarized light and S-polarized light by the polarizing beam splitter 503. By this process being repeated, almost all of the light from the white light source is converted into P-polarized light and emerges.

Other part of the light emitted from the white light source 501 passes via the reflecting mirror 504, and then is separated into P-polarized light and S-polarized light by the polarizing beam splitter 503. The P-polarized light is reflected substantially perpendicularly by the other reflecting mirror 504, and the S-polarized light is intactly returned to the vicinity of the light source 501. The process thereafter is similar to what has been described above.

Figure 16:
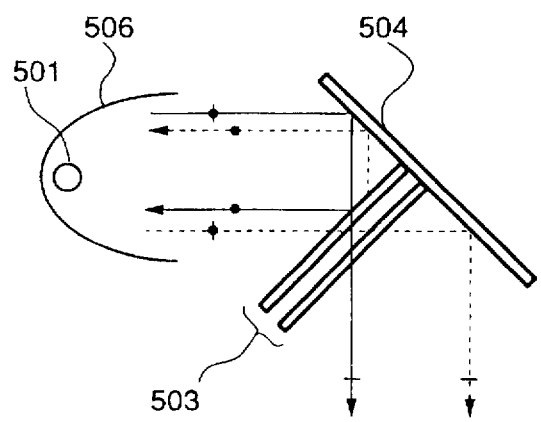
FIG. 16 shows another embodiment of the polarizing illuminating device of the present invention.

As a variation of the device of FIG. 15, a single reflecting mirror 504 may be formed as shown, for example, in FIG. 16. Further, a wavelength plate such as a quarter wavelength optical phase plate 507 may be disposed between the white light source and the polarizing beam splitter 503 so as to positively change the polarized state of the light returned to the white light source 501.

In each of the embodiments shown in FIGS. 8, 9, 10, 11, 12, 15 and 16, two polarized lights separated by the polarizing beam splitter finally emerge discretely from each other without being super-posed one upon the other and therefore, the irregularity of the quantities of light of these two light beams poses a problem, but if as previously described, use is made of dielectric material film having such a characteristic that the transmittance of P-polarized light is 90% and the transmittance of S-polarized light is 63%, the P-polarized light transmitted through the polarizing beam splitter and the S-polarized light reflected by the polarizing beam splitter will become substantially equal in quantity of light each other and therefore, the difference in quantity of light between the two light beams which provide the illuminating light can be minimized.

In each embodiment, the normal to the polarizing separating element is disposed so as to form an angle of about 45° with respect to the light beam from the light source, but alternatively, it may be disposed at any angle differing from 45° with respect to said light beam.

Although the polarizing separating efficiency of the polarizing beam splitter can be suitably determined by film design, it is desirable that uniform polarizing separating efficiency be attained as far as possible over the whole range of visible light, i.e., 380 nm or 400 nm to 780 nm. However, red light of 700 nm or greater does not much contribute as image light and therefore, actually, it will pose little or no problem to design the film such that uniform polarizing separating efficiency can be attained for wavelengths of 380 nm or 400 nm to 700 nm.

In each embodiment, a glass substrate is employed as the holding member and thin dielectric material film is employed as the interfering polarizing separating member, whereas these are not restrictive, but various members are applicable without departing from the gist of the present invention.

What is claimed is:

1. A device for illuminating an object to be illuminated with light from a light source, said device comprising:

a transparent flat plate;

beam splitting films provided on opposite surfaces of said transparent flat plate, wherein each of said beam splitting films has a transmittance characteristic such that transmittance of P-polarized light is different from transmittance of S-polarized light, wherein a transmitted light from one of said beam splitting films includes said P-polarized light and said S-polarized light, and a reflected light of said one of said beam splitting films contains substantially only a single polarization direction of light;

wherein the other one of said beam splitting films resplits said transmitted light from said one of said beam splitting films to produce a transmitted light of said other one of said beam splitting films, and a polarization changing plate for making the polarization direction of said transmitted light of said other one of said beam splitting films be the same as said single polarization direction of light.

2. A device according to claim 1, wherein the distance between said beam splitting films on said opposite surfaces is sufficiently greater than the wavelength of incident light so that interference of light is not generated in said films.

3. A device according to claim 1, wherein said beam splitting films transmit therethrough most of the P-polarized light of light incident at an angle of incidence of 45°.

4. A device for illuminating an object to be illuminated with light from a light source, said device comprising:

a first member including a transparent flat plate and beam splitting films provided on opposite surfaces of said transparent flat plate;

wherein each of said beam splitting films has a transmittance characteristic such that transmittance of P-polarized light is different from transmittance of S-polarized light, wherein a transmitted light from one of said beam splitting films includes said P-polarized light and said S-polarized light, and a reflected light of said one of said beam splitting films contains substantially only a single polarization direction of light;

wherein the other one of said beam splitting films resplits said transmitted light from said one of said beam splitting films, and a second member including a transparent flat plate and beam splitting films provided on opposite surfaces of said transparent flat plate of said second member, wherein each of said beam splitting films of said second member has a transmittance characteristic which is different with respect to P-polarized light and S-polarized light, wherein a transmitted light from one of said beam splitting films of said second member includes said P-polarized light and said S-polarized light, wherein the other one of said beam splitting films of said second member resplits said transmitted light from said one of said beams splitting films of said second member to produce a transmitted light of said other one of said beam splitting films of said second member;

said transparent flat plate of said second member being provided parallel to said transparent flat plate of said first member, and a polarization changing plate for making the polarization direction of said transmitted light of said other one of said beam splitting films of said second member be the same as said single polarization direction of light.

5. A device according to claim 4, wherein the distance between said beam splitting films on said opposite surfaces is sufficiently greater than the wavelength of incident light so that interference of light is not generated in said films.

6. A device according to claim 4, wherein said beam splitting films transmit therethrough most of the P-polarized light of light incident at an angle of incidence of 45°.

7. An apparatus for forming an image by illuminating a light valve with light from a light source, said apparatus comprising:

a transparent flat plate;

beam splitting films provided on opposite surfaces of said transparent flat plate, wherein each of said beam splitting films has a transmittance characteristic such that transmittance of P-polarized light is different from transmittance of S-polarized light, wherein a transmitted light from one of said beam splitting films includes said P-polarized light and said S-polarized light, and a reflected light of said one of said beam splitting films contains substantially only a single polarization direction of light;

wherein the other one of said beam splitting films resplits said transmitted light from said one of said beam splitting films between said light source and said light valve to produce a transmitted light of said other one of said beam splitting films, and a polarization changing plate for making the polarization direction of said transmitted light of said other one of said beam splitting films be the same as said single polarization direction of light.

8. An apparatus according to claim 7, wherein the distance between said beam splitting films on said opposite surfaces is sufficiently greater than the wavelength of incident light so that interference of light is not generated in said films.

9. An apparatus according to claim 7, wherein said beam splitting films transmit therethrough most of the P-polarized light of light incident at an angle of incidence of 45°.

10. An apparatus for forming an image by illuminating a light valve with light from a light source, said apparatus comprising:

a first member including a transparent flat plate and beam splitting films provided on opposite surfaces of said transparent flat plate;

wherein each of said beam splitting films has a transmittance characteristic such that transmittance of P-polarized light is different from transmittance of S-polarized light, wherein a transmitted light from one of said beam splitting films includes said P-polarized light and said S-polarized light, and a reflected light of said one of said beam splitting films contains substantially only a single polarization direction of light;

wherein the other one of said beam splitting films resplits said transmitted light from said one of said beam splitting films, and a second member including a transparent flat plate and beam splitting films provided on opposite surfaces of said transparent flat plate of said second member, wherein each of said beam splitting films of said second member has a transmittance characteristic which is different with respect to P-polarized light and S-polarized light, wherein a transmitted light from one of said beam splitting films of said second member includes said P-polarized light and said S-polarized light, wherein the other one of said beam splitting films of said second member resplits said transmitted light from said one of said beams splitting films of said second member to produce a transmitted light of said other one of said beam splitting films of said second member;

said transparent flat plate of said second member being provided parallel to said transparent flat plate of said first member between said light source and said light valve, and a polarization changing plate for making the polarization direction of said transmitted light of said other one of said beam splitting films of said second member be the same as said single polarization direction of light.

11. An apparatus according to claim 10, wherein the distance between said beam splitting films on said opposite surfaces is sufficiently greater than the wavelength of incident light so that interference of light is not generated in said films.

12. An apparatus according to claim 10, wherein said beam splitting films transmit therethrough most of the P-polarized light of light incident at an angle of incidence of 45°.

13. An optical apparatus for processing light from a light source, said optical apparatus comprising:

a transparent flat plate;

beam splitting films provided on opposite surfaces of said transparent flat plate, wherein each of said beam splitting films has a transmittance characteristic such that transmittance of P-polarized light is different from transmittance of S-polarized light, wherein a transmitted light from one of said beam splitting films includes said P-polarized light and said S-polarized light, and a reflected light of said one of said beam splitting films contains substantially only a single polarization direction of light;

wherein the other one of said beam splitting films resplits said transmitted light from said one of said beam splitting films to produce a transmitted light of said other one of said beam splitting films, and a polarization changing plate for making the polarization direction of said transmitted light of said other one of said beam splitting films be the same as said single polarization direction of light.

14. An optical apparatus according to claim 13, wherein the distance between said beam splitting films on said opposite surfaces is sufficiently greater than the wavelength of incident light, so that interference of light is not generated in said films.

15. An optical apparatus according to claim 13, wherein said beam splitting films transmit therethrough most of the P-polarized light of light incident at an angle of incidence of 45°.

16. An optical apparatus for processing light from a light source, said optical apparatus comprising:

a first member including a transparent flat plate and beam splitting films provided on opposite surfaces of said transparent flat plate;

wherein each of said beam splitting films has a transmittance characteristic such that transmittance of P-polarized light is different from transmittance of S-polarized light, wherein a transmitted light from one of said beam splitting films includes said P-polarized light and said S-polarized light, and a reflected light of said one of said beam splitting films contains substantially only a single polarization direction of light;

wherein the other one of said beam splitting films resplits said transmitted light from said one of said beam splitting films, and a second member including a transparent flat plate and beam splitting films provided on opposite surfaces of said transparent flat plate of said second member, wherein each of said beam splitting films of said second member has a transmittance characteristic which is different with respect to P-polarized light and S-polarized light, wherein a transmitted light from one of said beam splitting films of said second member includes said P-polarized light and said S-polarized light, wherein the other one of said beam splitting films of said second member resplits said transmitted light from said one of said beams splitting films of said second member to produce a transmitted light of said other one of said beam splitting films of said second member;

said transparent flat plate of said second member being provided parallel to said transparent flat plate of said first member, and a polarization changing plate for making the polarization direction of said transmitted light of said other one of said beam splitting films of said second member be the same as said single polarization direction of light.

17. An optical apparatus according to claim 16, wherein the distance between said beam splitting films on said opposite surfaces is sufficiently greater than the wavelength of incident light, so that interference of light is not generated in said films.

18. An optical apparatus according to claim 16, wherein said beam splitting films transmit therethrough most of the P-polarized light of light incident at an angle of incidence of 45°.

* * * * *